US007013188B2

(12) United States Patent
Nicolle et al.

(10) Patent No.: US 7,013,188 B2
(45) Date of Patent: Mar. 14, 2006

(54) PROGRAMMING STATION GENERATING A PROGRAM IN SINGLE LANGUAGE AND AUTOMATION EQUIPMENT USING SUCH A PROGRAM

(75) Inventors: Pascal Nicolle, Cagnes s/Mer (FR); Christian Tuccinardi, Golfe Ilian (FR); Bruno Bories, Le Cannet (FR)

(73) Assignee: Schneider Automation, Valbonne (FR)

( * ) Notice: Subject to any disclaimer, the term of this patent is extended or adjusted under 35 U.S.C. 154(b) by 288 days.

(21) Appl. No.: 10/073,193

(22) Filed: Feb. 13, 2002

(65) Prior Publication Data

US 2004/0015844 A1 Jan. 22, 2004

(30) Foreign Application Priority Data

Feb. 19, 2001 (FR) ................................. 01 02302

(51) Int. Cl.
  *G05B 19/42* (2006.01)
(52) U.S. Cl. .................... 700/86; 700/83; 717/106; 717/114; 717/136
(58) Field of Classification Search ................ 700/83, 700/84, 86, 87; 715/513, 514; 717/106–108, 717/136, 137, 114–116
See application file for complete search history.

(56) References Cited

U.S. PATENT DOCUMENTS

| 5,267,145 | A | * | 11/1993 | Zifferer et al. ............... 700/86 |
| 5,485,620 | A | * | 1/1996 | Sadre et al. ................ 717/162 |
| 5,731,974 | A | * | 3/1998 | Pietzsch et al. .............. 700/83 |
| 5,801,942 | A | * | 9/1998 | Nixon et al. ................. 700/83 |
| 5,812,394 | A | * | 9/1998 | Lewis et al. ................. 700/17 |
| 6,256,598 | B1 | * | 7/2001 | Park et al. .................... 703/2 |
| 6,342,907 | B1 | * | 1/2002 | Petty et al. ................ 345/762 |
| 6,393,341 | B1 | * | 5/2002 | Lawrence et al. .......... 700/286 |
| 6,437,805 | B1 | * | 8/2002 | Sojoodi et al. ............. 345/763 |
| 6,463,352 | B1 | * | 10/2002 | Tadokoro et al. ........... 700/169 |
| 6,507,857 | B1 | * | 1/2003 | Yalcinalp .................... 715/513 |
| 6,565,609 | B1 | * | 5/2003 | Sorge et al. ................ 715/503 |
| 6,598,219 | B1 | * | 7/2003 | Lau ............................ 717/108 |
| 6,618,629 | B1 | * | 9/2003 | Martens et al. ............... 700/9 |
| 6,757,869 | B1 | * | 6/2004 | Li et al. ..................... 715/513 |
| 2002/0004804 | A1 | * | 1/2002 | Muenzel .................... 707/513 |
| 2003/0121000 | A1 | * | 6/2003 | Cooper et al. ............. 715/513 |

FOREIGN PATENT DOCUMENTS

| EP | 0 184 422 | 6/1986 |
| WO | WO 95/23374 | 8/1995 |

* cited by examiner

*Primary Examiner*—John Follansbee
*Assistant Examiner*—Aaron Perez-Daple
(74) *Attorney, Agent, or Firm*—Steptoe & Johnson LLP

(57) ABSTRACT

This invention relates to a programming station for an automation application that will be executed in an automation equipment. The programming station stores at least one file in an internal memory containing a description grammar for automation applications in text format, for at least one of the graphic automation languages (Ladder, SFC, FBD) using a single, hierarchised and object oriented language. It also contains a set of one or several description files, each description file describing part of the automation application and being expressed in this single language. The single, hierarchised and object oriented language is the XML (eXtended Markup Language) language.

12 Claims, 3 Drawing Sheets

PROGRAMMING STATION GENERATING A PROGRAM IN SINGLE LANGUAGE AND AUTOMATION EQUIPMENT USING SUCH A PROGRAM

FIELD OF THE INVENTION

This invention relates to a programming station generating a program using a single hierarchised and object oriented language to program an automation application and automation equipment using a program generated by such a programming station.

BACKGROUND OF THE INVENTION

In the following, a programming station refers to computer equipment, particularly a PC type personal computer, that can be connected to an automation equipment. In the following, automation equipment refers to a programmable logic controller, an instrumentation/control station, a numerical control or other equipment that can contain and execute an application program controlling an automation application. For example, this automation application may be in the domain of industrial process automation, building automation or instrumentation/control of electrical distribution networks.

This type of automation equipment is composed of a central unit and one or several input-output modules connected to sensors and preactuators of the automation application to be controlled.

The central unit comprises at least one processor, a non-volatile memory, usually not modifiable (ROM) or modifiable (EEPROM) containing the manufacturer's program also called the proprietary operating system, expressed in a language specific to the manufacturer of the automation equipment, a RAM memory and an input-output manager communicating together through a back plane bus. A first area of the RAM memory (also called the volatile memory) contains the user's program, and a second area contains the data, and particularly images of the states of input-output modules and constants related to the user's program.

The user's program, also called the application program, monitors or controls an automation application by means of inputs-outputs controlled by this application program. The designer creates this program and it is written in one or several graphic automation languages particularly including Ladder Diagrams called Ladder language in the following, Sequential Function Charts called SFC language in the following, Function Block Descriptions called FBD language in the following, or in IL (Instruction List) or ST (Structured Text) type automation text languages. These automation languages are preferably conform with standard IEC 1131-3 to facilitate programming by an automation designer who is not necessarily familiar with computer languages. These languages can be used on programming stations that may or may not be connected to an automation equipment to be programmed.

At the moment, application programs created using graphic automation languages conform with standard IEC 1131-3 cannot be exchanged between automation equipment made by different manufacturers with manufacturer programs based on different manufacturer languages. After the designer of an automatic control has produced the application program in one of the standard languages, the programming station on which the designer is working translates this program into the specific language of the manufacturer of the automation equipment on which the application program was developed, since there is no standard exchange format.

SUMMARY OF THE INVENTION

The first purpose of the invention is to obtain a programming station using a single, hierarchised and object oriented language that can be edited by any editor to describe automation applications regardless of the graphic language used to operate the automation equipment.

This purpose is achieved by the fact that a programming station for an automation application designed to be executed in an automation equipment has an internal memory in which it stores at least one grammar file containing description grammar for automation applications in text format, for at least one of the graphic automation languages (ladder, SFC, FBD) using a single, hierarchised and object oriented language. The programming station also contains a set of one or several description files in memory, each description file describing part of the automation application and being expressed in the single, hierarchised and object oriented language.

According to one feature, the single, hierarchised and object oriented language is the XML (eXtended Markup Language) language.

According to another feature, all application description files contain an application program description file, an application input-output description file, and an application data description file.

According to another feature, a grammar file describes an application in Ladder language defining the different elements of the Ladder language like objects, each of these elements containing attributes either in the form of objects, parameters, variables or texts, and forming information stored in the internal memory of the programming station and that can be represented in the form of a tree structure. The various elements of the Ladder language include a contact, a horizontal link, a vertical link, a coil, a short circuit, an empty cell, a function block call, an FFB expression, a comparison block and an arithmetical operations block.

According to another feature, a grammar file describes an application in the SFC language by defining the different elements of the SFC language, namely a step, a transition, a jump, a link between graphs, a comment, as objects, and the graphic coordinates of the different jump, step or transition type elements being defined by a position type object defining the coordinates of the position of the corresponding object in the table of rows and columns on which the graph of the object is displayed on the programming station display means.

According to another feature, a grammar file describes an application in the FBD language using the different elements of the FBD language as objects. The different elements of the FBD language include function blocks, text boxes, links between blocks, jump instructions, labels and comments.

Another purpose is to propose a programming station capable of importing or exporting existing automation applications in graphic automation languages (Ladder, SFC, FBD) in the single language.

This purpose is achieved by the fact that the programming station comprises an XML handler Hndlr in non-volatile memory dialoguing through notifications, firstly with a tree structure management module representative of the automation application expressed in the single, hierarchised and object oriented language, and also with a plurality of database managers, each manager being specific to part of the automation application stored in one of the databases.

The final purpose of the invention is to propose an automation equipment using a single language to describe an automation application, regardless of the manufacturer's language used on the automation equipment.

This purpose is achieved using an automation equipment capable of executing an automation application and characterised in that it comprises memory means to store a set of one or several automation application description files expressed in a single, hierarchised and object oriented language. The automation equipment also comprises translation means to convert description files into a binary language that can be executed by the automation equipment.

According to one feature, the single, hierarchised and object oriented language is the XML (eXtended Markup Language) language and the description file(s) respects (respect) one of the grammars for translation from one or more graphic automation languages among the Ladder language, the SFC language and the FBD language, into the XML language.

According to another feature, the automation equipment comprises means of checking that the description of the application in the XML language satisfies the description grammar of the graphic automation language used, as a function of which graphic automation language is used.

The proposed XML grammar can be used to define a text exchange format for the five graphic or text languages (LD, SFC, FBD, IL, ST) conform with standard IEC 1131-3. Since the files are in ASCII, they can be edited using standard text editors (Notepad, etc.) on any programming station, regardless of whether or not it is connected to the automation equipment.

Automation application data will also be described in the XML language and thus will be easily imported or exported to different third party software (electrical CAD, Supervision, etc.).

XML language files will also be transformed into other XML language files with a different grammar, using the style sheets mechanism (XSLT: eXtensible Stylesheet Language Transformation). For example, it will be very easy to make a gateway between data in an automation application and a spreadsheet software such as Microsoft Corporation's EXCEL.

Parts of applications generated in the XML language will be displayed by WEB search, display, edit utilities (browsers) such as Internet Explorer, which include XML display units in the basic version. Another advantage of the proposed solution is that it offers a formal grammar for exchanging programs and data for an automation application.

BRIEF DESCRIPTION OF THE DRAWINGS

Other features and advantages of this invention will become clearer after reading the following description with reference to the appended drawings in which.

DESCRIPTION OF THE EMBODIMENTS

Figure 1:
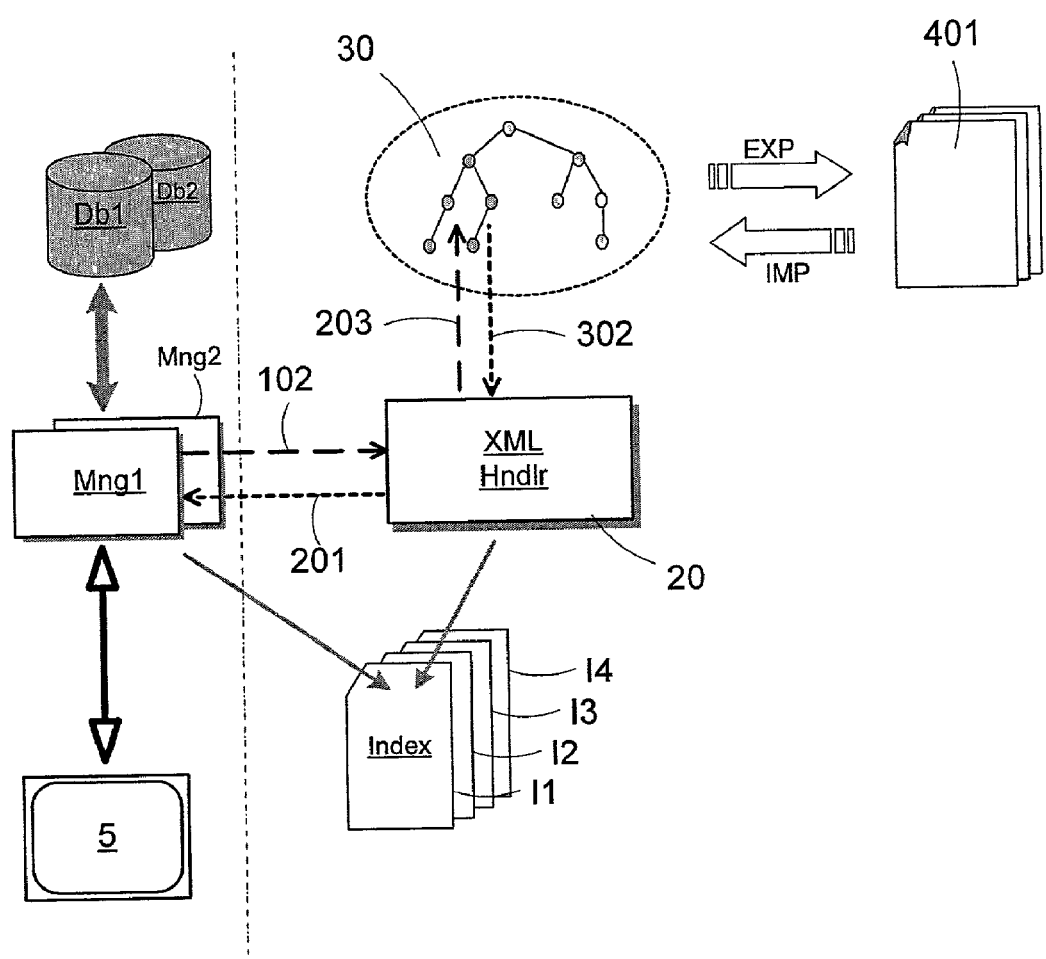
FIG. 1 shows a diagrammatic view of a programming station on which an XML manager is installed to import or export description files from a single language application to one of the graphic languages.

The invention consists of describing an automation application using a single object oriented language based on hierarchised objects starting from a grammar of this language specific to the translation into this language of an automation application program written in one of the graphic languages conform with standard IEC1131-3. For example, in the embodiment presented, this single, hierarchised and object oriented language may be the XML (eXtended Markup Language) language. The description is text only (no binary information), it is independent of the implementation and must respect XML standards. The XML description of an application may be stored in full or in part in the form of a set of one or several description files. These files may be imported and/or exported to and from third party software. Each descriptive object of the application in the XML language is assigned firstly XML tags that are words enclosed between "less than" (<) and "greater than" (>) signs, and also by attributes (in the form name="value"). Therefore the entire application can be described using tags and attributes. The tags are only used to delimit data elements and the application that reads the data interprets these data completely. These tags are usually composed of words that are understandable even for a user who is not a person skilled in the art.

Normally an automation application is described by several description files comprising an application program description file, an application inputs-outputs description file, and an application data description file.

Appendix 1 contains one specific grammar for the translation of an application program description into a Ladder graphic language.

The description in the Ladder language is structured into contact networks, and each network is described line by line working from the top downwards. Each line is described from the left towards the right. Each line begins with the left rail (to the left of the view of the Ladder network) and terminates on the last element graphic described. Each line contains a list of standard graphic elements in the Ladder language (relay language); contacts, coils, horizontal link, vertical link, function block, etc. Graphic coordinates are relative to the position of objects in the table of rows and columns of a graphic display.

Line 10 in the grammar shown in appendix 1 corresponds to a graphic representation of an application in Ladder language, and defines that an "LDSource" application in Ladder is composed of a Ladder network (networkLD) and from zero to n (indicated by the * sign) text boxes (textBox) defined in lines 59 to 61. A Ladder network (networkLD) is composed of one or several type lines (typeLine) (indicated by the + sign) and a link with zero to n function blocks (FBLink). As described in line 50 in appendix 1, the link with at least one function block (FBLink) is composed of two position objects (objPosition), the coordinates of these position objects defining a start position corresponding to the "from" attribute (from, line 51) and an end position corresponding to the "to" attribute (to, line 52). As described in line 13 in appendix 1, the type line (typeLine) object is composed from zero to n of a combination of the following objects, either an empty line (emptyLine), or a contact (contact), a horizontal link (Hlink), a vertical link (Vlink), a coil (coil), a control (control), a short circuit (shortCircuit), an empty cell (emptyCell), a function block call (calls), an FFB expression (FFBExpression), a comparison block (compareBlock) and an arithmetic operation block (operateBlock), at will.

The type line (typeLine) object has a text label attribute. The attribute of the contact object defined on line 18 is the type of contact that defines the contact type, open, closed, upwards, downwards, in the form of an enumeration (openContact, closedContact, Pcontact, Ncontact) and the name of the contact variable (ContactVariableName) that is of type text. Line 23 defines the horizontal link (Hlink) object that has a number of cells (numberCell) through which the horizontal link (Hlink) passes, as an attribute. Lines 26 and 27 in appendix 1 define the coil (coil) object that can be either of type coil (Coil), inverse coil (not Coil), coil for setting to one (setCoil), reset coil (resetCoil), transition hash coil (hashCoil) used only in association with the SFC language, rising front coil (Pcoil), falling front coil (Ncoil) and the name of the coil variable (coilVariableName) that is of type text. The control object (control) defines the control type, either jump (jumpCoil) or return (retCoil) on lines 35 to 37. The short circuit object (shortCircuit) is defined on line 38 as being the combination of vertical link (Vlink) objects and one of the horizontal link (Hlink), contact, coil (coil), calls (calls), comparison block (compareBlock) elements at will. A call block (calls) as defined on line 39, contains an instance of an object (instanceObj), a parameter type (typeParam) and a call description (descriptionCall). The parameter type (typeParam) and the call description (descriptionCall) may have different values, as indicated by the "?" sign. The value of the parameter type is defined on line 41 as being a boolean value equal to "0" or "1" (enEn0) Line 43 defines the description of a call (descriptionCall) as being composed of a list of inputs (inputListFBD) to the function block (FBD) that are lists of formal parameters and effective parameters (see lines 45 and 46) and a list of outputs (outputListFBD) from the function block (FBD). The text boxes are defined by the position of the text box object and by its dimensions in height and width.

For sections written in Ladder language, each application program may be described using the grammar corresponding to the Ladder graphic language. Each grammar is used to define a hierarchy between objects and to represent an application in the form of a graphic tree structure (30) in the programming station RAM memory.

Thus, as can be seen in appendix 1, the root of the tree is composed of the source application (LDSource) to which one or several sons are attached, namely the network (networkLD) and possibly one or several text boxes (textBox). The network has one or several sons composed of type line (typeLine) and FB link type (FBLink) objects. The line type (typeLine) object has a son consisting of the empty line (emptyLine), or one of the following elements: contact (contact), vertical link (Vlink), horizontal link (Hlink), coil (coil), control (control), short circuit (shortCircuit), calls (calls), comparison of blocks (compareBlock), execution of block (operateBlock), FFB expression (FFBExpression).

Appendix 2 defines a grammar specific to the translation of a description of an application in the SFC graphic language, into the XML language.

Line 11 of the grammar shown in appendix 2 defines that the description of an application (SFCSource) into the SFC language comprises a header (SFCHeader) and is structured into pages (SFCPage) that correspond to screen pages displayed by the SFC language editor. The header (SFCHeader) has the task (task) and the graph name (graphName) as attributes. Each page may contain one or several SFC networks (networkSFC). Each network contains a list of "object" elements chosen among the following standard graphic elements of the SFC language: step (step), jump (jump), transition (transition), link between steps and transition (SFCLinkObject), comment (commentSFC), link between graphs (linkSFC). The graphic coordinates of the different jump, step or transition type objects are defined by a position type object (objPosition) defining the position of the corresponding object (jump, step or transition) in the grid as the row/column. A step type object (step) is defined by one or several actions in which the attributes are defined on lines 23 and 24 in appendix 2. Transitions are also defined by transition conditions (transitionCondition). Link between graphs type objects (linkSFC) are composed of two position objects (objPosition), the coordinates of these position objects defining a start position corresponding to the "from an object type" (typeObjectFrom) attribute and an end position corresponding to the "to an object type" attribute (typeObjectTo). Each of these two attributes is chosen from one of the following objects: initial step (initialStep), step (step), macro step (macroStep), internal step (stepIn), transition (transition, A branch (Abranch), P branch (Pbranch), A joint (Ajoint), P joint (Pjoint), and for the "to" attribute, chosen from the previous objects and the jump object (jump).

The hierarchy of the SFC language is as follows. The root of the tree structure is the source object (SFCSource) that itself has the header (SFCHeader) and the page (SFCPage) as sons. The page has the network (networkSFC) as son, and the sons of the said network are the step (step), the jump (jump), the transition (transition), the SFC object link (SFCLinkObject), the SFC comment (commentSFC), and the SFC link between graphs (linkSFC).

Similarly, appendix 3 shows a grammar specific to the translation of a description of an application in an FBD graphic language into the XML language.

Each network in the FBD language contains a list of standard graphic elements in the FBD language: the function block (FFBBlock), text box (textboxFBD), label (labelObject), comment (commentObject FBD), link between blocks (linkFBD) and jump instruction (jumpObject). Each element is defined in accordance with lines 12 to 39 in appendix 3. The graphic coordinates are relative to the position of objects in the table defining the row/column.

The hierarchy between objects defined in this grammar is as follows. The root is composed of the FBD source (FBDSource), which is composed of one or several FBD networks (networkFBD). Each network is composed of one or several of the following son elements: the block (FFBBlock), the text box (textBoxFBD), the label (labelObject), the jump (jumpObject), the comment (commentObjectFBD) and the link (linkFBD).

Figure 2:
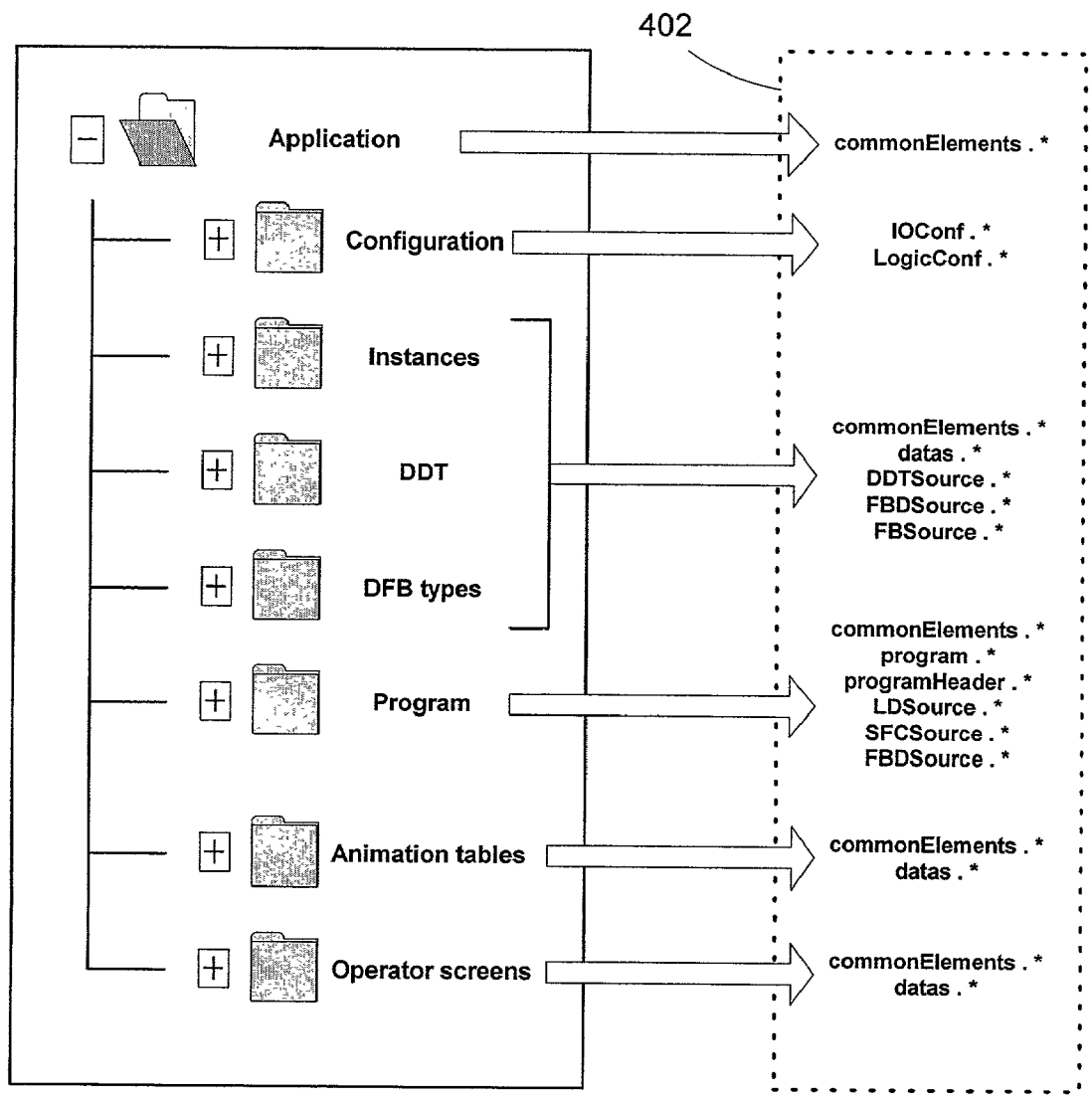
FIG. 2 shows an example of the memory organization of the grammar used to describe an automation application in the single language according to the invention.

The grammar description files (402, FIG. 2) are in text format and are organised as follows. An automation application may be broken down into three main parts, its program, its data and its inputs/outputs. According to the invention, the grammar of each of these parts is described in a "Document Type Definition" file in the ".dtd" format (for example program.dtd for the application program file, datas.dtd for the data file, IOConf.dtd for the inputs/outputs configuration file) or in a "Schematic" file in the ".xsd" format. In the following, we will talk about ".dtd" files but they may be replaced by ".xsd" files which are equivalent. Thus, when the "datas.*" type notation is used, it refers to a data file that may be either a "datas.dtd" or "datas.xsd" type file. Each part of the application program may itself be broken down into sub-parts each forming the subject of a ".dtd" (or ".xsd") description file. For example, the program file (program.dtd) may include source files (LDSource.dtd, SFCSource.dtd and FBDSource.dtd, as shown in FIG. 2) that contain grammars of different graphic automation languages of the Ladder diagram, sequential function chart (SFC) and function block (FBD) types.

".dtd" and ".xsd" grammar files (402) are files specific to the automation equipment manufacturer. They contain a description of the different grammars and define the structure of the XML description files. Thus the "Application" file (FIG. 2) contains the (commonElements.*) file that contains elements common to the automation application, namely the application name, the production date of the application or the version, the version number and comments. The "Configuration" file contains configuration files for inputs/outputs (IOConf.*) and for the logical configuration (LogicConf.*) respectively. The "Instance", "DDT", "DFB types" files contain the description of data, instance, DDT, FB type in the form of (data, DDTSource.*, FBDSource.*, FBSource.*) files. The "Program" file contains the (LDSource.*, SFCSource.* and FBDSource.*) files that contain the description of each grammar specific to each normal graphic automation representation described in appendices 1 to 3 (Ladder language, SFC language, FBD language) respectively. The "Animation tables" folder contains the description of animation tables, that includes the (commonElements.* and datas.*) files. The "Operator screens" folder contains descriptions of operation screens composed of common element files (commonElements.*) and file data (datas.*).

These different grammar files (402) define the structure of XML files. An XML file of an application represents an instance of the grammar defined in the corresponding ".dtd" file. XML description files (401) are specific to the automation application considered. The principle of correspondence between these two types of files is defined by the XML standard V1.0 in accordance with the Document Object Model (DOM). The document object model DOM is a set of standard programming functions (API—Application Programming Interface) for manipulating XML files.

Figure 3:
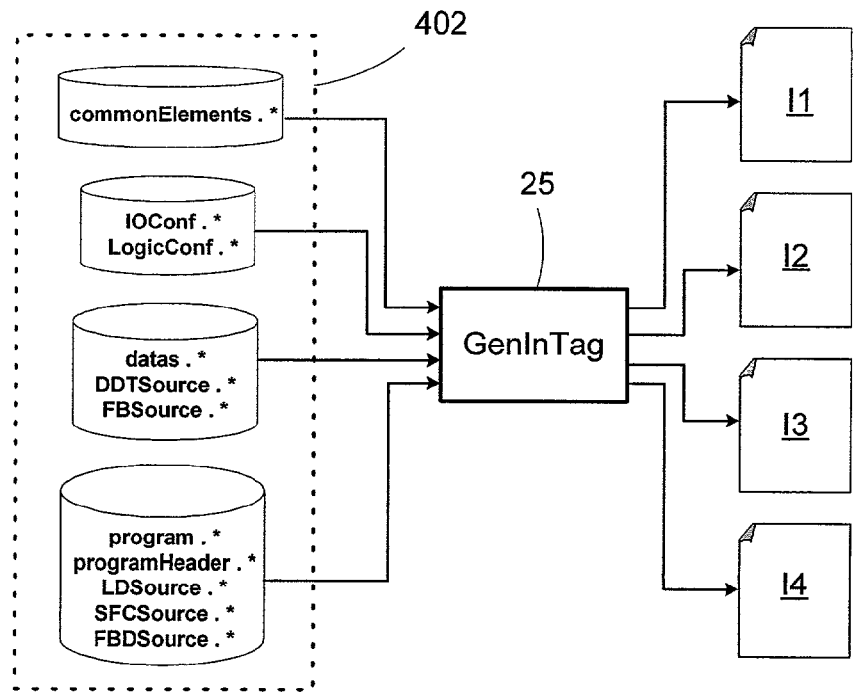
FIG. 3 shows a software component that forms a tag index generator to produce index files.

Correspondence between XML files and application databases is as follows:

An automation application is stored in binary format on a programming station that can be connected to an automation equipment. This automation application according to prior art was developed by the user who used an editor (5) for graphic languages IEC 1131-3 using a software component subsequently called a manager (Mng1, Mng2, etc.) to store user inputs in several databases; for example one database (Db1) for the application program, one database (Db2) for application data and one database (Db3) for the configuration of application inputs-outputs, (Db1) and (Db2) being shown in FIG. 1. The description of the application in the XML language according to the invention is completely independent of its implementation in manufacturer databases. A particular software component has been developed in order to achieve this independence; this component forms an automatic tag index generator represented in FIG. 3 and is referred to in the following as the GenInTag (25) component.

The GenInTag software component (25) generating tag indexes must be executed to produce index files (".h") in order to make the correspondence between the XML graphic tree structure (30) representing the automation application in the language according to the invention, and database structures (Db1, Db2). More particularly, an index file is used to create the correspondence between tree structure nodes produced by the execution of files in the XML language and objects associated with graphic automation description languages that are stored in databases. This GenInTag component extracts keywords (elements, objects and attributes) from the different ".dtd" grammar files (402) that define XML grammars for the program, data, the input-output configuration in the XML language, in order to generate indexes organised in several files, for example four files (I1, I2, I3, I4) in FIG. 3, each containing one or several files of index constants used by the different managers (Mng1, Mng2, . . . ) managing an application.

The GenInTag component reads definition files for the document type ".dtd" or diagram type ".xsd"—and generates the different index files. The embodiment presented includes index files (I1) for the definition of keywords of the hardware and software configuration (SrcTagIOConf.h, SrcTagLogicConf.h), index files (I2) for the definition of data keywords and data types grouped in the (SrcTagDatas.h, SrcTagDDTSource.n, SrcTagFBSource.h) files, index files (I3) for the definition of keywords for the (SrcTagProgram.h, SrcTagProgramHeader.h, SrcTagSFCSource.h, SrcTagLDSource.h, SrcTagBDSource.h) program, and index files (I4) for the definition of keywords common to the other parts of the application (SrcTagCommonElements.h). These index files create the correspondence that makes it possible to use application description databases (Db1, Db2, . . . ) according to prior art. They are stored in non-volatile memory on the programming station.

Figure 4:
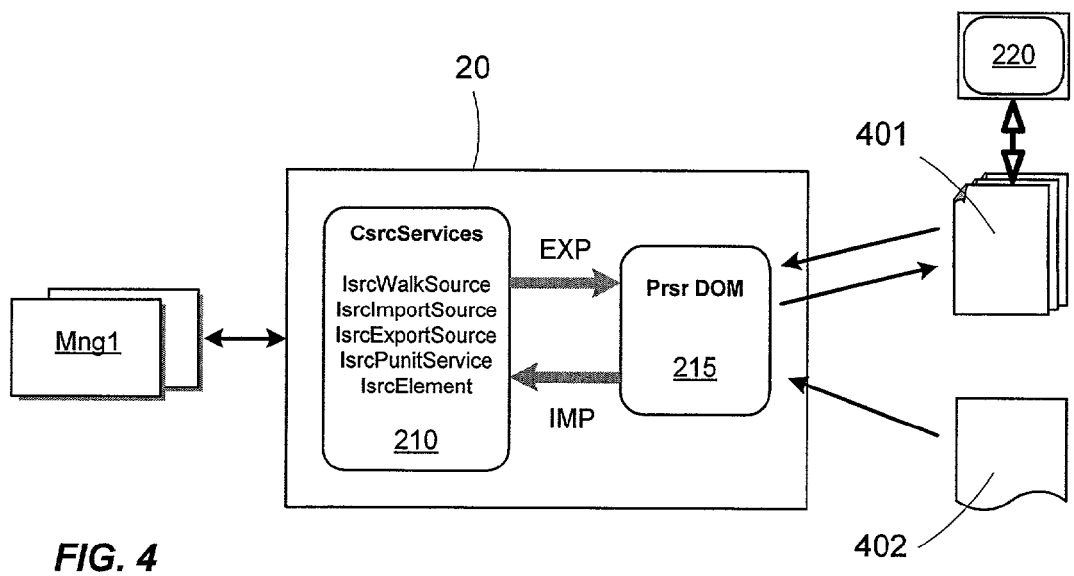
FIG. 4 shows a diagrammatic view of component modules of an XML handler Hndlr to import and export files from one language to another.

The programming station includes an XML Handler Hndlr (20) program in non-volatile memory. The XML handler Hndlr (20) is a software component developed in the C++ language that can be used through a COM interface. It encapsulates and uses the services of a DOM Parser Prsr (215) and offers high level services for the management of the XML graphic tree structure (30). The XML Handler Hndlr (20) is shown in more detail in FIG. 4 and is used to create the tree structure (30) representative of the application from description files (401) using grammar files (402), or to create this structure starting from requests made by managers (Mng1, Mng2, . . . ) of application databases. It uses the different managers that call the services of the XML Handler Hndlr (20) using index files (I1 to I4) generated by the GenInTag component (25). As shown in FIG. 1, each part of an application, for example an application program (Db1), application data (Db2), is managed by a specific manager (for example Mng1 for the application program, Mng2 for the data). The XML Handler Hndlr (20) comprises the DOM Parser Psrs which is a software component in the C++ language, and also an export routine (EXP) and an import routine (IMP).

The export routine (EXP) writes automation application data in one (or several) XML description file(s) and the import routine reads automation application data in one (or several) XML description file(s). These routines use the service of a service module (210) (CsrcServices) that is itself broken down into several services. One service (IscrWalkSource) is used to move about in the file (401) loaded in memory. The service module (CsrcServices) also comprises a service (IscrImportSource) that is a service to initialise reading a description file (401), the service (IsrcexportSource) that is a service to write files and the component (IsrcPUnitService) that is used to manage services specific to the programming station. Finally, the XML Handler Hndlr (20) comprises a service (IscrElement) that enables access to the contents of XML data (elements and attributes). Each manager (Mng1, Mng2, . . . ) dialogs with the different services of the XML Handler Hndlr (20). They use index files (I1 to I4) generated by the GenInTag component (25) corresponding to the data in the database.

The application stored on the programming station in a set of one or several XML description files (401) is modelled by the XML Handler Hndlr (20) in the form of a tree structure (30) using firstly information distributed in the memory of the programming station in databases (Db1, Db2, . . . ) and in the form of binary files, and secondly indexes (I1 to I4) created by the GenInTag component (25) to access this information and represent it in tree structure form. The XML Handler Hndlr (20) component communicates with managers (Mng1, Mng2, . . . ) of databases (Db1, Db2, . . . ) and with the application structure management module, through notifications as shown in FIG. 1.

Thus, during the export routine, a manager (Mng1) can send a notification (102) <<CreateNode (index, value)>> requesting the XML Handler Hndlr (20) to create a node with a determined index and a determined value. The XML Handler Hndlr (20) uses index values and grammar files (402) and will request the tree structure management module to create a node with a notification (203) <<CreateNode (tagname, value)>>, with the name defined by <<tagname>> for its tag name, and the value denoted by <<value>> for its value. Conversely in the import routine, a manager (Mng1) asks the XML Handler Hndlr (20) to send information to it about a node through a notification (201) <<GetNode (index, value)>>. The XML Handler Hndlr (20) that receives this notification examines the index and the corresponding tag name (Tag) in the mapping tables from the index files (I1 to I4). The XML Handler Hndlr (20) then asks the structure management module to send a notification (302) to it <<GetNode (tagname, value)>>.

The manager (20) defined in this way installed on a programming station, with grammar files (402) for the XML language, can be used to define an automation application that can be edited by any editor (220, FIG. 4) since the application XML description files (401) thus obtained are in ASCII and can be edited and modified using any text editor. This avoids the need for specific programs to display graphic languages specific to automation applications.

The invention also relates to an automation equipment capable of executing an automation application in the manufacturer's language, in the form of a binary file. The automation equipment comprises memory means to store a set of one or several automation application description files, these description files being expressed in a single, hierarchised and object oriented text language. This type of automation equipment also comprises translation means such as an interpreter module to convert description files into one or several files in the manufacturer's binary language that can be executed by the automation equipment. In the embodiment presented, this single, hierarchised and object oriented language may for example be the XML (eXtended Markup Language) language. The function of the interpreter module is to translate the instructions describing an automation application formulated in the XML language, into instructions executable by the proprietary operating system of the automation equipment. In particular it includes an XML Parser (DOM prsr) to analyse the XML language and the compilation means.

In this way, the result is automation equipment in which the programming language would be accessible from any available editor on a PC type machine so that the automation application designer could develop application programs in which the files would be stored in ASCII text form regardless of the manufacturer of the automation equipment and the operating system used, provided only that the XML language interpreter module is installed in the automation equipment in the proprietary binary language.

The description file(s) respects (respect) one of the grammars for translation of one or several graphic automation languages among the Ladder language, the SFC language and the FBD language, into the XML language. Therefore, the automation equipment includes means of checking that the description of the application in the XML language satisfies the description grammar of the graphic automation language used, as a function of which graphic automation language is used. The memory means in the automation equipment also contain the grammar files (402) for this purpose.

Another advantage of the invention is that it makes it possible to use old programs that have already been developed by converting (exporting) these programs formulated in databases (Db1, Db2, . . . ) into XML files.

Furthermore, the XML handler Hndlr (20) also has the advantage that it can import description file of an application developed in the XML language into an application that uses one of the graphic automation description languages (LD, SFC, FBD) used in the past.

Graphic languages may thus be described in a standard manner in ASCII. This standardization of the grammar makes it possible to exchange automation programs between different operating systems made by different manufacturers.

Programming in XML is independent of a graphic technology, independent of Windows, and is independent of any graphic library or any graphic format (JPEG, BMP, etc.)

The invention enables the exchange of application programs between heterogeneous programming workshops (different manufacturers, different operating systems, etc.). The invention enables the generation of standard application programs that may be installed on different platforms. The invention also enables the automatic generation of automation application programs by XML generators.

The invention also facilitates the exchange of data in the form of XML files with CAD and CAM software for electrical schematics, and supervision software.

Appendices 4, 5, 6 describe grammar files in "Diagram" (".xsd") syntax for translation into the XML language from the Ladder language (appendix 4), SFC language (appendix 5) and FBD language (appendix 6). These files could be used on programming stations making use of this ".xsd" language. An expert in this subject will find the same objects and attributes in these appendices as in the text syntax (".dtd" in appendices 1 to 3), but in this case expressed in the Diagram syntax (".xsd"). The position of the object relative to the beginning of the line in appendices 4 to 6 defines the hierarchical dependence of the object, through its indent.

It will be obvious to experts in the subject that this invention can be used in many other specific embodiments without departing from the scope of the invention as claimed; Consequently, the embodiments given herein must be considered as illustrations but may be modified within the domain defined by the scope of the appended claims.

APPENDIX 1

DTD description of the grammar of the Ladder language

```
<!-
<!ENTITY % commonElements SYSTEM "commonElements.dtd">
%commonElements;
```

APPENDIX 1-continued

DTD description of the grammar of the Ladder language

```
-->
<!ELEMENT LDSource (networkLD , textbox* )>
<!ATTLIST LDSource sectionSize CDATA #IMPLIED >
<!ELEMENT networkLD (typeLine+ , FBLink* )>
<!ELEMENT typeLine (emptyLine | (contact | Hlink | Vlink | coil |
control | short Circuit | emptyCell | Calls | FFBExpression |
compareBlock | operateBlock)*>
<!ATTLIST typeLine label CDATA #IMPLIED >
<!ELEMENT emptyLine EMPTY>
<!ELEMENT contact EMPTY>
<!ATTLIST contact typeContact ( openContact |
                                closedContact |
                                PContact |
                                Ncontact ) #REQUIRED
                ContactVariableName CDATA #IMPLIED>
<!ELEMENT Hlink EMPTY>
<!ATTLIST Hlink numberCell CDATA #IMPLIED >
<!ELEMENT Vlink EMPTY>
<!ELEMENT coil EMPTY>
<!ATTLIST coil typeCoil ( coil |
                          notCoil |
                          setCoil |
                          resetCoil |
                          hashCoil |
                          Pcoil |
                          Ncoil ) #REQUIRED
                CoilVariableName CDATA #IMPLIED >
<!ELEMENT control EMPTY>
<!ATTLIST control typeControl (jumpCoil | retCoil ) #REQUIRED
                 label CDATA #REQUIRED >
<!ELEMENT shortCircuit (Vlink, (Hlink | contact | coil | calls |
compareBlock))>
<!ELEMENT calls (instanceObj, typeParam?, descriptionCall?)>
<!ELEMENT typeParam (#PCDATA)>
<!ATTLIST typeParam    enEn0 CDATA #IMPLIED
                       heightSize CDATA #IMPLIED >
<!ELEMENT descriptionCall (inputListFBD*, outputListFBD*)>
<!ELEMENT inputListFBD EMPTY>
<!ATTLIST inputListFBD formalParameterName CDATA #IMPLIED
                       effectiveParameter CDATA #IMPLIED >
<!ELEMENT outputListFBD EMPTY>
<!ATTLIST outputListFBD formalParameterName CDATA #IMPLIED
                        effectiveParameter CDATA #IMPLIED >
<!ELEMENT FBLink (objPosition, objPosition+)>
<!ATTLIST FBLink from CDATA #REQUIRED
                 to CDATA #REQUIRED >
<!ELEMENT compareBlock (#PCDATA)>
<!ELEMENT FFBExpression (#PCDATA)>
<!ELEMENT operateBlock (#PCDATA)>
<!ELEMENT emptyCell EMPTY>
<!ATTLIST emptyCell cellNbr CDATA #IMPLIED >
<!ELEMENT textbox (objPosition)>
<!ATTLIST textbox dimH CDATA #REQUIRED
                  dimW CDATA #REQUIRED
                  textbox NMTOKENS #IMPLIED >
```

APPENDIX 2

DTD description of the grammar of the SFC language

```
<!--<!ENTITY % commonElements SYSTEM "commonElements.dtd">
%commonElements;
-->
<!ELEMENT SFCSource (SFCHeader, SFCPage)>
<!ELEMENT SFCHeader EMPTY>
<!ATTLIST SFCHeader task CDATA #IMPLIED
                    graphName CDATA #IMPLIED >
<!ELEMENT SFCPage (networkSFC*)>
<!ELEMENT networkSFC ((step | jump | transition | SFCLinkObject |
commentSFC)*, linkSFC*)>
<!ELEMENT step (objPosition, action*)>
<!ATTLIST step stepName NMTOKEN #IMPLIED
               stepType (initialStep | step | macroStep | instep |
outStep) #FIXED 'step'>
```

APPENDIX 2-continued

DTD description of the grammar of the SFC language

```
<!ELEMENT action (actionName)>
<!ATTLIST action qualifer (P1 | N | PO | R | S | L | D | P | DS)
#REQUIRED
                tValue CDATA #IMPLIED >
<!ELEMENT actionName (#PCDATA)>
<!ELEMENT jump (objPosition)>
<!ATTLIST jump stepName CDATA #IMPLIED >
<!ELEMENT transition (objPosition, transitionCondition?)>
<!ATTLIST transition transitionName CDATA #IMPLIED >
<!ELEMENT transitionCondition (transitionName | variableTransition
| boolLitteral)>
<!ELEMENT transitionName (#PCDATA)>
<!ELEMENT variableTransition (#PCDATA)>
<!ELEMENT boolLitteral EMPTY>
<!ATTLIST boolLitteral boolLitteral (0 | 1) #IMPLIED >
<!ELEMENT SFCLinkObject (objPosition)>
<!ATTLIST SFCLinkObject width           CDATA #IMPLIED
                        relativePos     CDATA #IMPLIED
                        SFCLinkObjectType CDATA (ABranch |
                                                PBranch
| AJoint | PJoint) #REQUIRED >
<!ELEMENT commentSFC (#PCDATA | objPosition)*>
<!ATTLIST commentSFC height CDATA #IMPLIED
                     width CDATA #IMPLIED >
<!ELEMENT linkSFC (objPosition, objPosition+)>
<!ATTLIST linkSFC typeObjectFrom (initialStep |
                                  step |
                                  macroStep |
                                  stepIn |
                                  transition |
                                  ABranch |
                                  PBranch |
                                  AJoint |
                                  PJoint ) #REQUIRED
                  TypeObjectTo   (initialStep |
                                  step |
                                  macrostep |
                                  stepout |
                                  transition |
                                  ABranch |
                                  PBranch |
                                  AJoint |
                                  Pjoint |
                                  jump ) #REQUIRED >
```

APPENDIX 3

DTD description of the grammar of the FBD language

```
<!--<!ENTITY % commonElements SYSTEM "commonElements.dtd">
%commonElements;
-->
<!ELEMENT FBDSource (networkFBD+)>
<!ELEMENT networkFBD  ((FFBBlock | textBoxFBD | labelObject |
commentObjectFBD | linkFBD) *, jumpObject? ) >
<!ELEMENT FFBBlock  (instanceObj, typeParamFBD, objPosition,
descriptionFBD? )>
<!ELEMENT typeParamFBD (#PCDATA)>
<!ATTLIST typeParamFBD enEn0 CDATA #IMPLIED
                       heightSize CDATA #IMPLIED >
<!ELEMENT descriptionFBD (inputvariable*, outputVariable*)>
<!ATTLIST descriptionFBD execOrder CDATA #IMPLIED >
<!ELEMENT inputVariable EMPTY>
<!ATTLIST inputVariable   formalParameterName CDATA #IMPLIED
                          effectiveParameter CDATA #IMPLIED
                          invertedPin (TRUE | FALSE) #IMPLIED>
<!ELEMENT outputVariable EMPTY>
<!ATTLIST outputVariable  formalParameterName CDATA #IMPLIED
                          effectiveParameter CDATA #IMPLIED
                          invertedPin (TRUE | FALSE) #IMPLIED >
<!ELEMENT labelObject (objPosition)>
<!ATTLIST labelobject label CDATA #IMPLIED >
<!ELEMENT jumpObject (objPosition)>
<!ATTLIST jumpObject label CDATA #IMPLIED >
```

APPENDIX 3-continued

DTD description of the grammar of the FBD language

```
<!ELEMENT textBoxFBD (#PCDATA | objPosition) *>
<!ATTLIST textBoxFBD width CDATA #IMPLIED
                     height CDATA #IMPLIED >
<!ELEMENT commentObjectFBD (#PCDATA | objPosition) *>
<!ELEMENT linkFBD (objPosition, objPosition, objPosition*)>
<!ATTLIST linkFBD origineLink CDATA #IMPLIED
                  destinationLink CDATA #IMPLIED >
```

APPENDIX 4

Diagram description of the grammar of the Ladder language

```
<?xml version = "1.0" encoding = "UTF-8"?>
<!- - Generated by XML Authority. Conforms to w3c
http://www.w3.org/2000/10/XMLSchema-->
<xsd : schema xmlns : xsd = "http://www.w3.org/2000/10/XMLSchema">
  <!--<xsd : include schemaLocation = "commonElements.xsd"/>-->
  <xsd : element name = "LDSource">
    <xsd : complexType>
      <xsd : sequence>
        <xsd : element ref = "networkLD"/>
        <xsd : element ref = "textBox" minOccurs = "0" maxOccurs =
        "unbounded"/>
      </xsd : sequence>
      <xsd : attribute name = "nbColumns" type = "xsd : string"/>
    </xsd : complexType>
  </xsd : element>
  <xsd : element name = "networkLD">
    <xsd : complexType>
      <xsd : sequence>
        <xsd : element ref = "typeLine" maxOccurs = "unbounded"/>
        <xsd element ref = "FBLink" minOccurs = "0" maxOccurs =
        "unbounded"/>
      </xsd : sequence>
    </xsd : complexType>
  </xsd : element>
  <xsd : element name = "typeLine">
    <xsd : complexType>
      <xsd : choice>
        <xsd : element ref = "emptyLine"/>
        <xsd : choice minOccurs = "0" maxOccurs = "unbounded">
          <xsd : element ref = "contact"/>
          <xsd : element ref = "HLink"/>
          <xsd : element ref = "VLink"/>
          <xsd : element ref = "coil"/>
          <xsd : element ref = "control"/>
          <xsd : element ref = "shortCircuit"/>
          <xsd : element ref = "emptyCell"/>
          <xsd : element ref = "calls"/>
          <xsd : element ref = "FFBExpression"/>
          <xsd : element ref = "compareBlock"/>
          <xsd : element ref = "operateBlock"/>
        </xsd : choice>
      </xsd : choice>
      <xsd : attribute name = "label" type = "xsd:string"/>
    </xsd : complexType>
  </xsd : element>
  <xsd : element name = "emptyLine">
    <xsd : complexType>
      <xsd : sequence/>
    </xsd : complexType>
  </xsd : element>
  <xsd : element name = "contact">
    <xsd : complexType>
      <xsd : sequence/>
      <xsd : attribute name = "typeContact" use = "required">
        <xsd : simpleType>
          <xsd : restriction base = "xsd :NMTOKEN">
            <xsd : enumeration value = "openContact"/>
            <xsd : enumeration value = "closeContact"/>
            <xsd : enumeration value = "PContact"/>
            <xsd : enumeration value = "NContact"/>
          </xsd : restriction>
        </xsd : simpleType>
```

APPENDIX 4-continued

Diagram description of the grammar of the Ladder language

```
      </xsd : attribute>
      <xsd : attribute name = "contactVariableName" type = "xsd :
      string">
    </xsd : complexType>
  </xsd : element>
  <xsd : element name = "HLink">
    <xsd : complexType>
      <xsd : sequence/>
      <xsd : attribute name = "numberCell" use = "required" type =
      "xsd:string"/>
      <xsd : complexType>
    </xsd : complexType>
  </xsd : element>
  <xsd : element name = "VLink">
    <xsd : complexType>
      <xsd : sequence/>
    </xsd : complexType>
  </xsd : element>
  <xsd : element name = "coil">
    <xsd : complexType>
      <xsd : sequence/>
      <xsd : attribute name = "typeCoil" use = "required">
        <xsd : simpleType>
          <xsd : restriction base = "xsd :NMTOKEN">
            <xsd : enumeration value = "coil"/>
            <xsd : enumeration value = "notCoil"/>
            <xsd : enumeration value = "setCoil"/>
            <xsd : enumeration value = "resetCoil"/>
            <xsd : enumeration value = "hashCoil"/>
            <xsd : enumeration value = "PCoil"/>
            <xsd : enumeration value = "NCoil"/>
          </xsd : restriction>
        </xsd : simpleType>
      </xsd : attribute>
      <xsd : attribute name = "coilVariableName" type =
      "xsd:string"/>
    </xsd : complexType>
  </xsd : element>
  <xsd : element name = "control">
    <xsd : complexType>
      <xsd : sequence/>
      <xsd : attribute name = "typeControl" use = "required">
        <xsd : simpleType>
          <xsd : restriction base = "xsd :NMTOKEN">
            <xsd : enumeration value = "jumpCoil"/>
            <xsd : enumeration value = "retCoil"/>
          </xsd : restriction>
        </xsd : simpleType>
      </xsd : attribute>
      <xsd : attribute name = "label" type = "xsd:string"/>
    </xsd : complexType>
  </xsd : element>
  <xsd : element name = "shortCircuit">
    <xsd : complexType>
      <xsd : sequence>
        <xsd : element ref = "Vlink"/>
        <xsd : choice>
          <xsd : element ref = "Hlink"/>
          <xsd : element ref = "contact"/>
          <xsd : element ref = "coil"/>
          <xsd : element ref = "calls"/>
          <xsd : element ref = "compareBlock"/>
        </xsd : choice>
      </xsd : sequence>
    </xsd : complexType>
  </xsd : element>
  <xsd : element name = "calls">
    <xsd : complexType>
      <xsd : sequence>
        <xsd : element ref = "instanceObj"/>
        <xsd : element ref = "typeParam" minOccurs = "0"/>
        <xsd : element ref = "descriptionCall" minOccurs "0"/>
      </xsd : sequence>
    </xsd : complexType>
  </xsd : element>
  <xsd : element name = "typeParam">
    <xsd : complexType>
      <xsd : simpleContent>
```

APPENDIX 4-continued

Diagram description of the grammar of the Ladder language

```
            <xsd : extension base = "xsd:string">
                    <xsd : attribute name = "enEn0" type = xsd:string"/>
                    <xsd : attribute name = "heightSize" type =
xsd:string"/>
            </xsd : extension>
        </xsd : simpleContent>
    </xsd : complexType>
</xsd : element>
<xsd : element name = "descriptionCall">
    <xsd : complexType>
        <xsd : sequence>
            <xsd : element ref = "inputListFBD" minOccurs = "0"
            maxOccurs = "unbounded"/>
            <xsd : element ref = "outputListFBD" minOccurs = "0"
            maxOccurs = "unbounded"/>
        </xsd : sequence>
    </xsd : complexType>
</xsd : element>
<xsd : element name = "inputListFBD">
    <xsd : complexType>
        <xsd : sequence/>
                <xsd : attribute name = "formalParameterName" type =
                xsd:string"/>
                <xsd : attribute name = "effectiveParameter" type =
                xsd:string"/>
    </xsd : complexType>
</xsd : element>
<xsd : element name = "outputListFBD">
    <xsd : complexType>
        <xsd : sequence/>
        <xsd : attribute name = "formalParameterName" type =
        xsd:string"/>
        <xsd : attribute name = "effectiveParameter" type =
        xsd:string"/>
    </xsd : complexType>
</xsd : element>
<xsd : element name = "FBLink">
    <xsd : complexType>
        <xsd : sequence>
            <xsd : element ref = "objPosition"/>
            <xsd : element ref = "objPosition" maxOccurs
            ="unbounded"/>
        </xsd : sequence>
        <xsd : attribute name = "from" use = "required" type =
        xsd:string"/>
        <xsd : attribute name = "to" use = "required" type =
        xsd:string"/>
    </xsd : complexType>
</xsd : element>
<xsd : element name = "compareBlock type = "xsd:string"/>
<xsd : element name = "FFBExpression type = "xsd:string"/>
<xsd : element name = "operateBlock type = "xsd:string"/>
<xsd : element name = "emptyCell type = "xsd:string"/>
    <xsd : complexType>
        <xsd : sequence/>
        <xsd : attribute name = "cellNbr" use = "required" type =
        xsd: string"/>
    </xsd : complexType>
</xsd : element>
<xsd : element name = "textbox">
    <xsd : complexType>
        <xsd : sequence>
            <xsd : element ref = "objPosition"/>
        </xsd : sequence>
        <xsd : attribute name = "dimH" use = "required" type =
        xsd:string"/>
        <xsd : attribute name = "dimW" use = "required" type =
        xsd:string"/>
        <xsd : attribute name = "textBox" use = "required" type =
        xsd:NMTOKENS"/>
    </xsd : complexType>
</xsd : element>
</xsd : schema>
```

APPENDIX 5

Diagram description of the grammar of the SFC language

```
<?xml version = "1.0" encoding = "UTF-8"?>
<!—Generated by XML Authority.   Conforms to w3c
http://www.w3.org/2000/10/XMLSchema-->
<xsd : schema xmlns : xsd = "http://www.w3.org/2000/10/XMLSchema">
    <!--<xsd : include schemaLocation = "commonElements.xsd"/>-->
    <xsd : element name = "SFCSource">
        <xsd : complexType>
            <xsd : sequence>
                <xsd : element ref = "SFCHeader"/>
                <xsd : element ref = "SFCPage"/>
            </xsd : sequence>
        </xsd : complexType>
    </xsd : element>
    <xsd : element name = "SFCHeader">
        <xsd : complexType>
            <xsd : sequence/>
            <xsd : attribute name = "task" type = "xsd:string"/>
            <xsd : attribute name = "graphName" type = "xsd:string"/>
        </xsd : complexType>
    </xsd : element>
    <xsd : element name = "SFCPage">
        <xsd : complexType>
            <xsd : sequence>
                <xsd : element ref = "networkSFC" minOccurs = "0" maxOccurs
                = "unbounded"/>
            </xsd : sequence>
        </xsd : complexType>
    </xsd : element>
    <xsd : element name = "networkSFC">
        <xsd : complexType>
            <xsd : sequence>
                <xsd : choice minOccurs = "0" maxOccurs = "unbounded"/>
                    <xsd : element ref = "step"/>
                    <xsd : element ref = "jump"/>
                    <xsd : element ref = "transition"/>
                    <xsd : element ref = "SFCLinkObject"/>
                    <xsd : element ref = "commentSFC"/>
                </xsd : choice>
                <xsd : element ref = "linkSFC" minOccurs = "0" maxOccurs =
                "unbounded"/>
            </xsd : element>
        </xsd : complexType>
    </xsd : element>
    <xsd : element name = "step">
        <xsd : complexType>
            <xsd : sequence>
                <xsd : element ref = "objPosition"/>
                <xsd : element ref = "action" minOccurs = "0" maxOccurs =
                "unbounded"/>
            </xsd : sequence>
            <xsd : attribute name = "stepName" type = "xsd:NMTOKEN"/>
            <xsd : attribute name = "stepType" use = "fixed" value =
            "step "/>
                <xsd : simpleType>
                    <xsd : restriction base = "xsd:NMTOKEN">
                        <xsd : enumeration value = "initialStep"/>
                        <xsd : enumeration value = "step"/>
                        <xsd : enumeration value = "macroStep"/>
                        <xsd : enumeration value = "inStep"/>
                        <xsd : enumeration value = "outStep"/>
                    </xsd : restriction>
                </xsd : simpleType>
            </xsd : attribute>
        </xsd : complexType>
    </xsd : element>
    <xsd : element name = "action">
        <xsd : complexType>
            <xsd : sequence>
                <xsd : element ref = "actionName"/>
            /xsd : sequence>
            <xsd : attribute name = "qualifer" use = "required">
                <xsd : simpleType>
                    <xsd : restriction base = "xsd:NMTOKEN">
                        <xsd : enumeration value = "P1"/>
                        <xsd : enumeration value = "N"/>
                        <xsd : enumeration value = "P0"/>
                        <xsd : enumeration value = "R"/>
```

APPENDIX 5-continued

Diagram description of the grammar of the SFC language

```
                <xsd : enumeration value = "S"/>
                <xsd : enumeration value = "L"/>
                <xsd : enumeration value = "D"/>
                <xsd : enumeration value = "P"/>
                <xsd : enumeration value = "DS"/>
            </xsd : restriction>
        </xsd : simpleType>
    </xsd : attribute>
    <xsd : attribute name = "tValue" type = "xsd:string">
</xsd : complexType>
</xsd : element>
<xsd : element name = "actionName" type "xsd:string"/>
<xsd : element name = "jump">
    <xsd : complexType>
        <xsd : sequence>
            <xsd : element ref = "objPosition"/>
        </xsd : sequence>
        <xsd : attribute name = "stepName" type = "xsd:string"/>
    </xsd : complexType>
</xsd : element>
<xsd : element name "transition">
    <xsd : complexType>
        <xsd : sequence>
            <xsd : element ref = "objPosition"/>
            <xsd : element ref = "transitionCondition" minOccurs = "0"/>
        </xsd : sequence>
        <xsd : attribute name = "transitionName" type = "xsd:string"/>
    </xsd : complexType>
</xsd : element>
<xsd : element name = "transitionCondition">
    <xsd : complexType>
        <xsd : choice>
            <xsd : element ref = "transitionName"/>
            <xsd : element ref = "variableTransition"/>
            <xsd : element ref = "boolLitteral"/>
        </xsd : choice>
    </xsd : complexType>
</xsd : element>
<xsd : element name = "transitionName" type "xsd:string"/>
<xsd : element name = "variableTransition" type "xsd:string"/>
<xsd : element name = "boolLitteral">
    <xsd : complexType>
        <xsd : sequence/>
        <xsd : attribute name = "boolLitteral">
            <xsd : simpleType>
                <xsd : restriction base = "xsd:NMTOKEN">
                    <xsd : enumeration value = "0"/>
                    <xsd : enumeration value = "1"/>
                </xsd : restriction>
            </xsd : simpleType>
        </xsd : attribute>
    </xsd : complexType>
</xsd : element>
<xsd : element name = "SFCLinkObject">
    </xsd : complexType>
        <xsd : sequence>
            <xsd : element ref = "objPosition"/>
        </xsd : sequence>
        <xsd : attribute name = "width" type = "xsd:string"/>
        <xsd : attribute name = "relativePos" type = "xsd:string"/>
        <xsd : attribute name = "SFClinkObjectType" use = "required">
            <xsd : simpleType>
                <xsd : restriction base = "xsd:NMTOKEN">
                    <xsd : enumeration value = "ABranch"/>
                    <xsd : enumeration value = "PBranch"/>
                    <xsd : enumeration value = "AJoint"/>
                    <xsd : enumeration value = "PJoint"/>
                </xsd : restriction>
            </xsd : simpleType>
        </xsd : attribute>
    </xsd : complexType>
</xsd : element>
<xsd : element name = "commentSFC">
    <xsd : complexType mixed = "true">
        <xsd : choice minOccurs = "0" maxOccurs = "unbounded">
```

APPENDIX 5-continued

Diagram description of the grammar of the SFC language

```
            <xsd : element ref = "objPosition"/>
        </xsd : choice>
        <xsd : attribute name = "height" type = "xsd:string"/>
        <xsd : attribute name = "width" type "xsd:string"/>
    </xsd : complexType>
</xsd : element>
<xsd : element name = "linkSFC">
    <xsd : complexType>
        <xsd : sequence>
            <xsd : element ref = "objPosition"/>
            <xsd : element ref =  "objPosition" maxOccurs = "unbounded"/>
        </xsd : sequence>
        <xsd : attribute name = "typeObjectFrom" use = "required"/>
            <xsd : simpleType>
                <xsd : restriction base = "xsd:NMTOKEN">
                    <xsd : enumeration value = "initialStep"/>
                    <xsd : enumeration value = "step"/>
                    <xsd : enumeration value = "macroStep"/>
                    <xsd : enumeration value = "stepIn"/>
                    <xsd : enumeration value = "transition"/>
                    <xsd : enumeration value = "ABranch"/>
                    <xsd : enumeration value = "PBranch"/>
                    <xsd : enumeration value = "AJoint"/>
                    <xsd : enumeration value = "PJoint"/>
                </xsd : restriction>
            </xsd : simpleType>
        </xsd : attribute>
        <xsd : attribute name = "typeObjectTo" use = "required"/>
            <xsd : simpleType>
                <xsd : restriction base = "xsd:NMTOKEN">
                    <xsd : enumeration value = "initialStep"/>
                    <xsd : enumeration value = "step"/>
                    <xsd : enumeration value = "macroStep"/>
                    <xsd : enumeration value = "stepOut"/>
                    <xsd : enumeration value = "transition"/>
                    <xsd : enumeration value = "ABranch"/>
                    <xsd : enumeration value = "PBranch"/>
                    <xsd : enumeration value = "AJoint"/>
                    <xsd : enumeration value = "PJoint"/>
                    <xsd : enumeration value = "jump"/>
                <xsd : restriction>
            </xsd : simpleType>
        </xsd : attribute>
    </xsd : complexType>
</xsd : element>
</ schema>
```

APPENDIX 6

Diagram description of the grammar of the FBD language

```
<?xml version = "1.0" encoding = "UTF-8"?>
<!—Generated by XML Authority.  Conforms to w3c http://www.w3.org/2000/10/XMLSchema-->
<xsd : schema xmlns : xsd = "http://www.w3.org/2000/10/XMLSchema">
<!--<xsd : include schemaLocation = "commonElements.xsd"/>-->
<xsd : element name = "FBDSource">
</xsd : complexType>
<xsd : sequence>
    <xsd : element ref = "networkFBD" maxOccurs = "unbounded"//>
    </xsd : sequence>
</xsd : complexType>
</xsd : element>
<xsd : element name = "networkFBD">
    <xsd : complexType>
    </xsd : sequence>
        <xsd : choice minOccurs = "0" maxOccurs = "unbounded">
            <xsd : element ref = "FFBBlook"/>
            <xsd : element ref = "textBoxFBD"/>
            <xsd : element ref = "labelObject"/>
            <xsd : element ref = "commentObjectFBD"/>
            <xsd : element ref = "linkFBD"/>
        </xsd : choice>
```

APPENDIX 6-continued

Diagram description of the grammar of the FBD language

```
            <xsd : element ref = "jumpObject" minOccurs = "0"/>
        </xsd : sequence>
    </xsd : complexType>
</xsd : element>
<xsd : element name = "FFBBlock">
    <xsd : complexType>
        <xsd : sequence>
            <xsd : element ref = "instanceObj"/>
            <xsd : element ref = "typeParamFBD"/>
            <xsd : element ref = "objPosition"/>
            <xsd : element ref = "descriptionFBD" minOccurs = "0"/>
        </xsd : sequence>
    </xsd : complexType>
</xsd : element>
<xsd : element name = "typeParamFBD">
    <xsd : complexType>
        <xsd : simpleContent>
            <xsd : extension base = "xsd:string">
                <xsd : attribute name = "enEn0" type = "xsd:string"/>
                <xsd : attribute name = "heightsize" type = "xsd:string"/>
            </xsd : extension>
        </xsd : simpleContent>
    </xsd : complexType>
</xsd : element>
<xsd : element name = "descriptionFBD">
    <xsd : complexType>
        <xsd : sequence>
            <xsd : element ref = "inputVariable" minOccurs = "0"
            maxOccurs = "unbounded"/>
            <xsd : element ref = "outputVariable" minOccurs = "0"
            maxOccurs = "unbounded"/>
        </xsd : sequence>
        </xsd : attribute name = "execOrder" type = "xsd:string"/>
    </xsd : complexType>
</xsd : element>
<xsd : element name = "inputVariable">
    <xsd : complexType>
        <xsd : sequence/>
        <xsd : attribute name = "formalParameterName" type =
        "xsd:string"/>
        <xsd : attribute name = "effectiveParameter" type =
        "xsd:string"/>
        <xsd : attribute name = "invertedPin"/>
            <xsd : simpleType>
                <xsd : restriction base = "xsd:NMTOKEN">
                    <xsd : enumeration value = "TRUE"/>
                    <xsd : enumeration value = "FALSE"/>
                </xsd : restriction>
            </xsd : simpleType>
        </xsd : attribute>
    </xsd : complexType>
</xsd : element>
<xsd : element name = "outputVariable">
    <xsd : complexType>
        <xsd : sequence/>
        <xsd : attribute name = "formalParameterName" type =
        "xsd:string"/>
        <xsd : attribute name = "effectiveParameter" type =
        "xsd:string"/>
        <xsd : attribute name = "invertedPin"/>
            <xsd : simpleType>
                <xsd : restriction base = "xsd:NMTOKEN">
                    <xsd : enumeration value = "TRUE"/>
                    <xsd : enumeration value = "FALSE"/>
                </xsd : restriction>
            </xsd : simpleType>
        </xsd : attribute>
    </xsd : complexType>
</xsd : element>
<xsd : element name = "labelObject">
    <xsd : complexType>
        <xsd : sequence>
            <xsd : element ref = "objPosition"/>
        <xsd : sequence>
        <xsd : attribute name = "label" type = "xsd:string"/>
    </xsd : complexType>
```

APPENDIX 6-continued

Diagram description of the grammar of the FBD language

```
</xsd : element>
<xsd : element name = "jumpObject">
    <xsd : complexType>
        <xsd : sequence>
            <xsd : element ref = "objPosition"/>
        </xsd : sequence>
        <xsd : attribute name = "label" type = "xsd:string"/>
    </xsd : complexType>
</xsd : element>
<xsd : element name = "textBoxFBD">
    <xsd : complexType mixed = "true">
        <xsd : choice minOccurs ="0" maxOccurs = "unbounded">
            <xsd : element ref = "objPosition"/>
        </xsd : choice>
        <xsd : attribute name = "width" type = "xsd:string"/>
        <xsd : attribute name = "height" type = "xsd:string"/>
    </xsd : complexType>
</xsd : element>
<xsd : element name = "commentObjectFBD">
    <xsd : complexType mixed ="true">
        <xsd : choice minOccurs ="0" maxOccurs = "unbounded">
            <xsd : element ref = "objPosition"/>
        </xsd : choice>
    </xsd : complexType>
</xsd : element>
<xsd : element name = "linkFBD">
    <xsd : complexType>
        <xsd : sequence>
            <xsd : element ref = "objPosition"/>
            <xsd : element ref = "objPosition"/>
            <xsd : element ref = "objPosition" minOccurs = "0"
            maxoccurs="unbounded" I>
        </xsd : sequence>
        <xsd : attribute name = "origineLink" type = "xsd:string"/>
        <xsd : attribute name = "destinationLink" type =
        "xsd:string"/>
    </xsd : complexType>
</xsd : element>
</schema>
```

The invention claimed is:

1. A programming station for generating an automation application program, to be executed in automation equipment and written in at least one graphic automation language, said programming station comprising:
   an internal memory for storing a plurality of grammar files written in text format and compliant with eXtensible Markup Language (XML) syntax,
   each said grammar file comprising a description grammar describing a syntax of a respective graphic automation language,
   said internal memory for storing a plurality of application description files, each said application description files being expressed in an XML language and describing part of said automation application program, and
   said programming station is for using at least one of said grammar files to generate at least one of said application description files describing part of said automation application program,
   wherein said automation application program is generated by said programming station using at least one of the application description files, and
   wherein said application description files comprise an automation application program description file, an application input-output description file and an application data description file.

2. The programming station according to claim 1, wherein:
   said grammar file comprises a Ladder language description program, wherein at least one application element of an application is described as an object comprising at least one attribute comprising at least one of objects, parameters, variables and texts, and the internal memory is for storing information having a tree structure.

3. The programing station according to claim 2, wherein application elements written according to the Ladder language program comprise a contact, a horizontal link, a vertical link, a coil, a short circuit, an empty cell, a function block call, a flexible function block expression, a comparison block and an arithmetical operations block.

4. The programing station according to claim 1, further comprising:

a programming station display means;

a table of rows and columns of data for displaying a graph of an object to be displayed by the programing station display means; and a position object for defining graphic coordinates of a position of said object to be displayed, wherein said grammar file comprises a Sequential Function Charts language description program for describing an application in the Sequential Function Charts language, wherein at least one application element of an application is described as an object comprising at least one of a step, a transition element, a jump, a link between graphs, and a comment.

5. The programing station according to claim 1, wherein said grammar file comprises a function block language description program for describing an application in the function block description language, wherein at least one application element of an application is described as an object in the function block description language.

6. The programing station according to claim 5, wherein the at least one application element comprises any of function blocks, text boxes, links between blocks, jump instructions, labels and comments.

7. The programing station according to claim 1, comprising an Extended Markup Language handler stored in non-volatile memory, said handler for sending and receiving notifications with a management module of a decision tree model representative of an automation application expressed in the single, hierarchical and object oriented language, and also with a plurality of database managers, each manager being specific to part of an automation application stored in one of the databases.

8. An automation equipment for executing an automation program, comprising memory means for storing a plurality of automation eXtensible Markup Language (XML) application description files expressed in XML language, each said XML application description file describing at least part of an automation program written in at least one graphic automation language compliant with the XML language, the automation equipment also comprising translating means for converting each XML application description file into a binary language that can be executed by the automation equipment; and a plurality of grammar files written in text format and compliant with XML syntax, each said grammar file comprising a description grammar describing a syntax of a respective graphic automation language, and at least one of the said grammar files is for generating at least one of said application description files;

wherein said application description files comprise an automation program description file describing said automation application program, an application input-output description file for describing inputs-outputs manages by said automation application program, and an application data description file for describing data used by said automation application program.

9. The automation equipment according to claim 8 wherein the set of XML application description files contains an application program description file, an application input-output description file, and an application data description file.

10. The automation equipment according to claim 8, further comprising a grammar file storing a description grammar, said description grammar for translation of at least a part of such automation program from at least one graphic automation language into the XML language.

11. The automation equipment according to claim 10, further comprising means for checking that the description of an application written in the XML language satisfies a description grammar of the graphic automation language used by the automation equipment.

12. The automation equipment according to claim 10, wherein the graphic automation language used by the automation equipment includes at least one language among the Ladder language, the SFC language and the FBD language.

* * * * *